United States Patent [19]
Tanaka

[11] Patent Number: 5,959,743
[45] Date of Patent: Sep. 28, 1999

[54] IMAGE PROCESSING APPARATUS WITH IMAGE OVERLAYING FUNCTION

[75] Inventor: Tomonori Tanaka, Yokohama, Japan

[73] Assignee: Ricoh Company, Ltd., Tokyo, Japan

[21] Appl. No.: 08/795,510

[22] Filed: Feb. 5, 1997

[30] Foreign Application Priority Data

Feb. 9, 1996 [JP] Japan ..................................... 8-048122

[51] Int. Cl.⁶ ................................................. G06F 15/66
[52] U.S. Cl. .......................................... 358/450; 358/448
[58] Field of Search ................................... 358/450, 448, 358/404, 524

[56] References Cited

U.S. PATENT DOCUMENTS

| | | | |
|---|---|---|---|
| 4,564,915 | 1/1986 | Evans et al. | 364/521 |
| 4,876,651 | 10/1989 | Dawson et al. | 364/449 |
| 4,954,970 | 9/1990 | Walker et al. | 364/521 |

*Primary Examiner*—Thomas D. Lee
*Assistant Examiner*—Stephen Brinich
*Attorney, Agent, or Firm*—Oblon, Spivak, McClelland, Maier & Neustadt, P.C.

[57] ABSTRACT

An image processing apparatus with an image overlaying mechanism by which image data from an inputting means source are overlaid with image data stored in a memory. A control unit controls reading out image data from the memory and storing overlaid image data into the memory effectively in parallel with the reading operation, and in the storing, stores overlaid image data being stored at addresses of the memory at which read out image data were stored. An output unit outputs overlaid image from the memory. As a result, quick outputting of an overlaid image speedy with a little page memory can be provided.

10 Claims, 8 Drawing Sheets

IMAGE PROCESSING APPARATUS WITH IMAGE OVERLAYING FUNCTION

BACKGROUND OF THE INVENTION

1. Field of the Invention

This invention relates to an image processing apparatus such as a printer, a copier, a facsimile, or a multifunction apparatus which has one or more such functions, and which has an image overlaying function.

2. Discussion of the Background

In recent years, in an image processing apparatus, the image editing function using an image memory has become popular in the trend towards digitization. For example, the "image rotation" function and the "image repeating" function implemented by an addressing at a reading of a memory, and the "into one" function by which two or more originals are formed on one recording paper by an addressing at a reading of a memory are known. Generally, the copier which has these function has more than one page image memory.

Also known is the "image overlaying" function which also uses the image memory. In this image overlaying function, two images are read by respective scannings and the two read images are overlaid, and thereafter outputted.

As a method of image overlaying, three methods are known.

(a) At first, two images which are read by scanning are stored in an image memory. Next, two stored images are overlaid and the overlaid image is stored in the image memory. Then, the overlaid image is outputted.

(b) At first, two images which are read by scanning are stored in an image memory. Then, these two images are read out from the image memory in parallel with overlaying and this overlaid image is outputted.

(c) At first, one of two image is scanned and stored an image memory. Next, an other image is scanned. The stored image is read out from an image memory in parallel with this scanning of the other image and these image are overlaid and outputted.

Method (a) and (b) are proposed by Japanese Patent Laid-open No. 61-176279 and method (c) is proposed by Japanese Patent Laid-open No. 60-114080. In these three methods, methods (a) and (b) need an image memory of more than two pages because in these methods, a storing of two page images is necessary. A large memory however increases cost of the apparatus.

On the other hand, method (c) needs an image memory of only one page. But method (c) has several problems. In particular, in method (c), the synchronization by pixel between the scanning and the reading out from the image memory is needed because the scanning and the reading out are done in parallel. Therefor, the reading out is done in sync with the PCLK (pixel clock) signal from a scanner. Because all processing must be done based on the PCLK from a scanner, a process speed is determined according to the speed of scanner. For example, during the scanner return, image forming is not able to be carried out. This is a first problem.

Recently, there is a digital copier which has some functions of a printer, a facsimile and a copier. In this digital copier, while outputting a copy image from an image memory, a sending facsimile from a scanner is possible. However, in the method (c), while outputting an overlaying image, a sending facsimile is impossible because a scanner is used for reading an image. This is a second problem.

A third problem concerns a memory copying function for forming of more than two sheets according to one original. In the memory copying function, when an original image is read by scanning, the image is formed on the first sheet and the read image is stored an image memory. Then, the second and later sheets are formed using the stored image without scanning. Therefore, copying speed is normally increased because a returning time of a scanner is not necessary.

However, in image overlaying function by the method (c), a scanning is necessary for forming the second or later sheet also because a scanning is necessary for image overlaying. Therefore, in the method (c), a memory copying is impossible.

SUMMARY OF THE INVENTION

Accordingly, it is an object of the invention to provide an image forming apparatus which is able to output an overlaid image quickly and with little page memory.

It is a further object of the invention to provide an image forming apparatus which is able to output an overlaid image quickly according the to character of an image forming means.

It is a further object of the invention to provide an image forming apparatus which is able to use one image for image overlaying many times without many times scans.

These and other objects are achieved by providing a novel image processing apparatus including an image overlaying mechanism which overlays an image from an inputting mechanism and a storing mechanism, a control mechanism and an output mechanism. The control mechanism reads out image data from the storing mechanism and stores overlaid image data into the storing mechanism in parallel, and in the storing, stores overlaid image data at the address where read out image data is stored. The output mechanism outputs overlaid image from the storing mechanism.

According to another aspect of the image processing apparatus of the present invention, the image overlaying mechanism further includes a generating mechanism which generates a synchronizing signal of at least two different frequencies and a frequency selecting mechanism which selects the frequency of the synchronizing signal. An image forming mechanism forms overlaid image data according to synchronizing signal which is selected by the frequency selecting mechanism.

Moreover, according to a further aspect of the invention, there is provided an image processing apparatus with an image overlaying mechanism further including a second storing mechanism which stores image data, a memory controlling mechanism which controls transfer of image data stored in second storing mechanism to the first storing mechanism, with the image overlaying mechanism overlaying image data from inputting mechanism and image data from the first storing mechanism.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
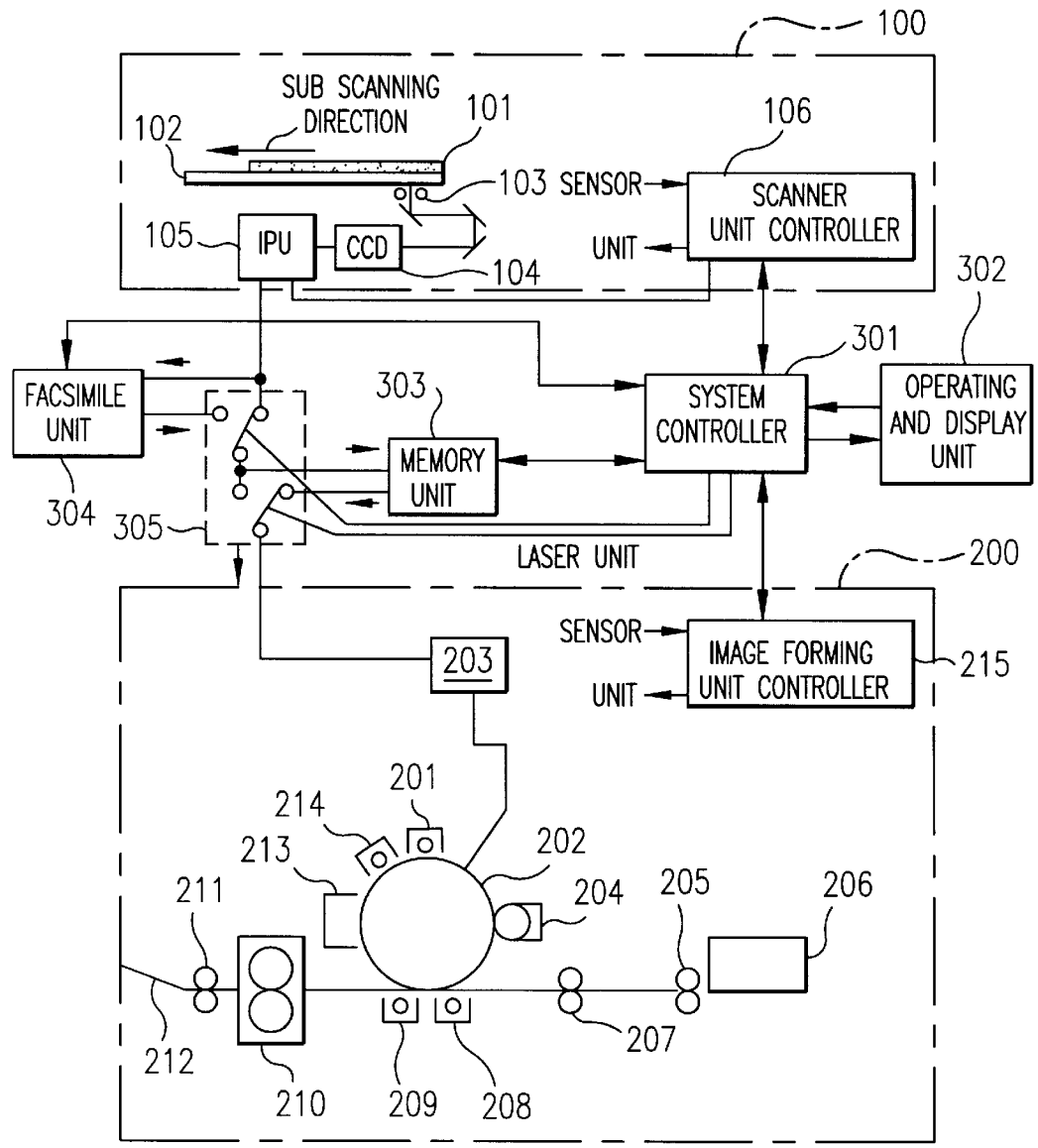
FIG. 1 is a schematic block diagram illustrating the construction of a digital copier in a first embodiment of the present invention.
Figure 2:
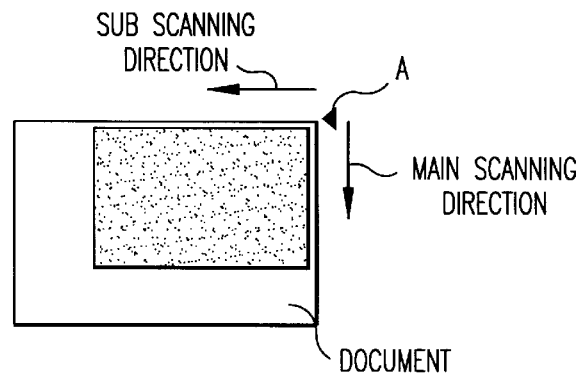
FIG. 2 is a top view of the document glass of the digital copier of the embodiment of FIG. 1.

Referring now to the drawings, wherein like reference numerals designate identical or corresponding parts throughout the several views, FIG. 1 shows the digital copier according to a first embodiment of present invention. In a scanner unit 100, the original document 101 which is set on a document glass 102 is illuminated by the illuminating lamp unit 103 which moves in a sub scanning direction, and the original document image is read by a CCD 104.

The CCD 104 converts reflected light from the original document to electrical image data and outputs the image data to IPU (image processing unit) 105. IPU 105 executes predetermined processing on the inputted image data, and then, the image data is converted to 8 bit digital data by A/D (analog to digital) converting. Moreover, as necessary, a scaling process and a dithering process is carried out to the image data. Thereafter, the image data is outputted to an image forming unit 200.

A scanner unit controller 106 receives signals from some sensors and controls some motors and so on for the above process, and sets some parameters of the IPU 105.

In the image forming unit 200, laser light which is modulated in a laser unit 203 according to the image data from the scanner unit 100 exposes the photoconductive element 202 which is uniformly charged by a charger 201 and rotates constantly. By this exposure, an electrostatic latent image is made on the photoconductive element 202 and, then, the electrostatic image is developed to a toner image by a developing unit 204.

A paper is fed from a paper tray 206 to a registration roller 207 by a feed roller 205 and, then, the paper is fed to the photoconductive element 202 at such a timing that the paper is aligned with the toner image by the registration roller 207. After that, the toner image on the photoconductive element 202 is transferred to the paper by a transfer charger 208 and then, the paper is separated from the photoconductive element 202 by a separating charger 209. A transferred toner image is fixed on the paper by a fixing unit 210, and then, the paper is fed to an output tray 212 by a roller 211.

On the other hand, after transferring, the toner which remains on the photoconductive element 202 is removed by a cleaning unit 213, and then, the photoconductive element 202 is discharged by a discharging unit 214. An image forming unit controller 215 receives signals from some sensors and controls some motors and so on for the above process.

Figure 3:
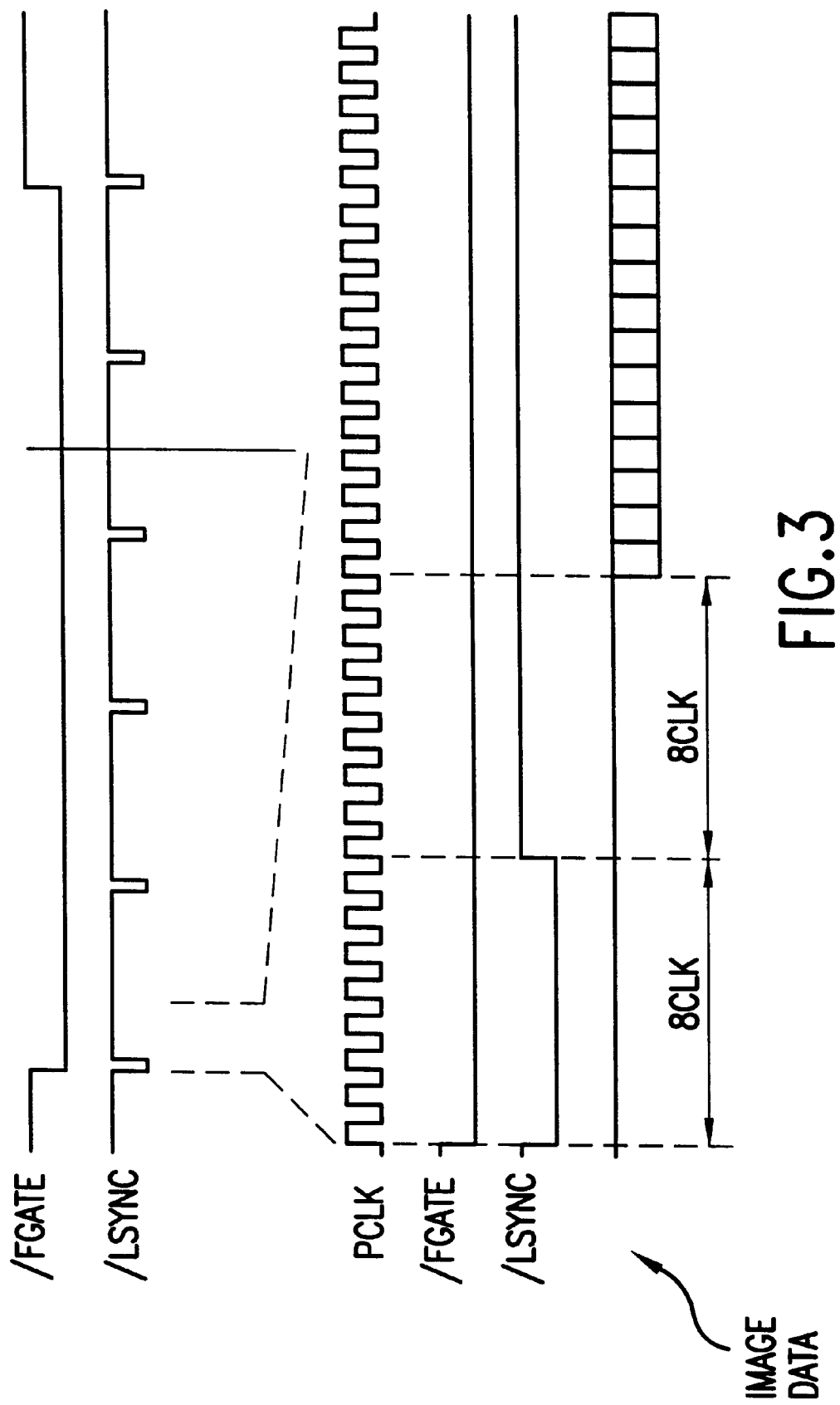
FIG. 3 is a timing diagram of the signal which is outputted from a scanning unit of the embodiment of FIG. 1.

FIG. 3 is timing diagram of the image synchronizing signal which is outputted from IPU 105. A FGATE (frame gate) signal describes the available area of the image area about the sub scanning direction. In the time that the FGATE signal is low level, image data are available. The FGATE signal is asserted and negated at a falling edge of a LSYNC (line synchronizing) signal. The LSYNC signal is asserted and negated at a falling edge of the PCLK (pixel clock) signal and is active during a predetermined number of clocks of the PCLK signal. After the LSYNC signal is asserted, after the number of predetermined clocks, image data are available about the main scanning direction.

One pixel image data corresponds to one cycle of the PCLK signal. The image data are sent in raster format. Generally the available area of the image area about sub scanning direction is determined by paper size.

In FIG. 1, a system controller 301 detects an inputting to an operating and display unit 302 by an operator, sets parameters at the scanner unit 100, a memory unit 303, the image forming unit 200 and a facsimile unit 304, and provides commands.

The facsimile unit 304 compresses inputted image data to binary data based on the G3 (Group 3) or G4 (Group 4) standard and outputs G3 or G4 data to a telephone line according to commands from the system controller 301. The facsimile data sent from a telephone line to the facsimile unit 304 are decompressed to a binary image data and the binary image data are sent to the laser unit 203 in the image forming unit 200 and an image forming is carried out.

A selector unit 305 selects data from among data from the scanner unit 100, the memory unit 303 and the facsimile unit 304, and the selected data are sent to the image forming unit 200.

The memory unit 303 of this embodiment stores the image data of one original document and is used in some functions, for example, an image repeating function, an image rotation function, etc. Moreover, the memory unit 303 is used as a page memory which stores binary image data from the facsimile unit 304 also. These functions are carried out according to commands from the system controller 301.

Figure 4:
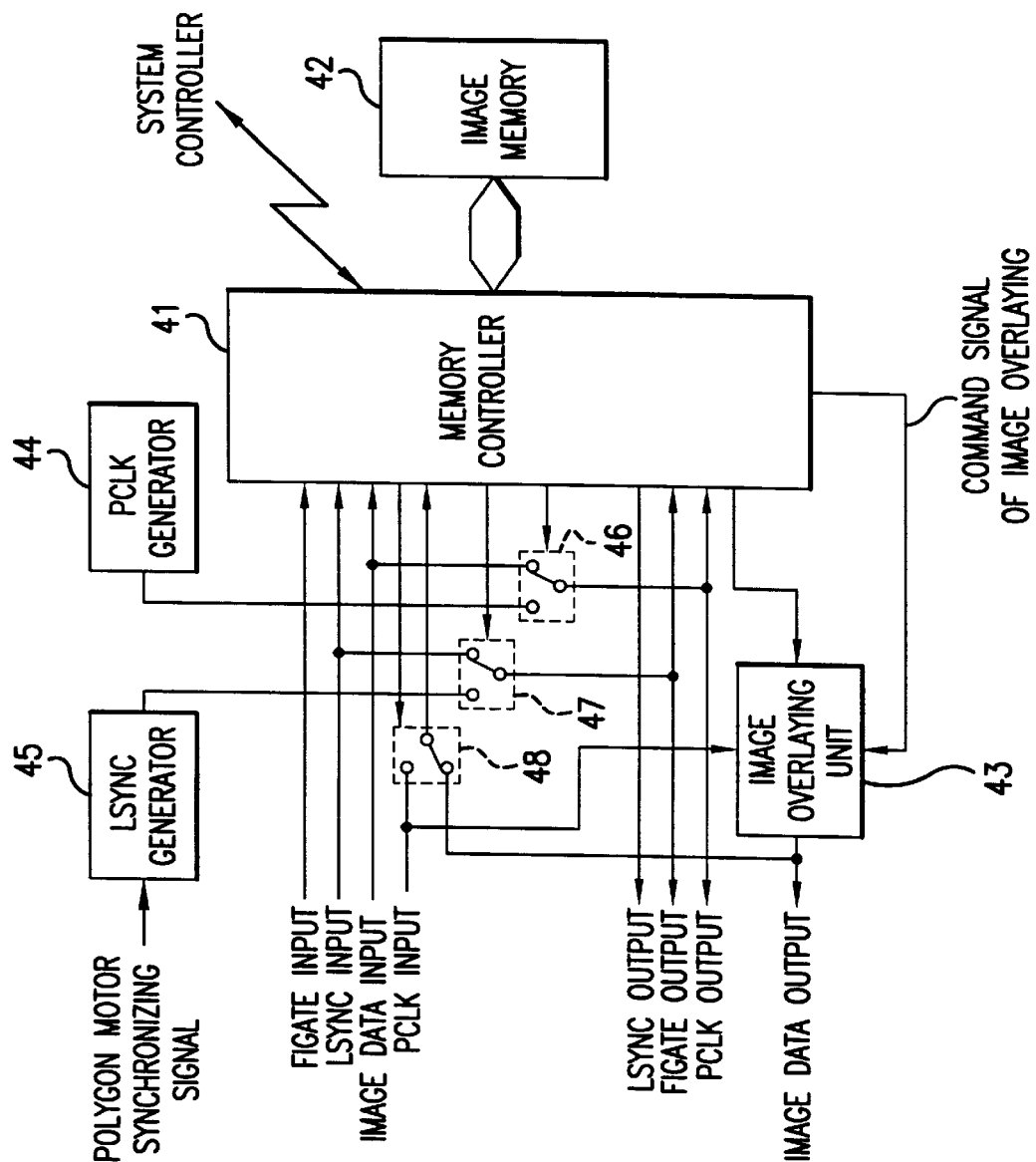
FIG. 4 is a block diagram showing the construction of a system controller of the first embodiment.

FIG. 4 is a diagram of the memory unit 303. An image memory 42 consists of memory devices, such as, for example, DRAMs and has ME capacity equal to the amount of binary data of one A3 sized page.

An image overlaying unit 43 includes an OR circuit and overlays inputted image data from the scanner unit 100 and image data from a memory controller 41 by OR computation according to an image overlaying command signal from the memory controller 41, and then the image overlaying unit 43 outputs the overlaid image. When the image overlaying function is not carried out, the inputted image data from scanner unit 100 is voided and the image data from the memory controller 41 is outputted.

A PCLK generator 44 includes an oscillation circuit and generates a clock signal of predetermined frequency which is enough to send pixels data of one line when one line of the image is formed in the image forming unit 200. An LSYNC generator 45 includes logic circuits, for example TTL (Transistor-Transistor Logic) and generates LSYNC.

The first selector 46 includes TTL and selects PCLK. The first selector 46 selects between PCLK from the PCLK generator 44 and the inputted PCLK from scanner unit 100 according to directions from the memory controller 41. The selected PCLK is sent to the memory controller 41 and the image forming unit 200.

The second selector 47 includes TTL and selects LSYNC. The second selector 47 selects between LSYNC from the LSYNC generator 45 and an inputted LSYNC from scanner unit 100 according to direction from the memory controller 41. A selected LSYNC is sent to the memory controller 41 and outputted to the image forming unit 200.

The third selector 48 includes TTL and selects image data between overlaid image data from the image overlaying unit 43 and inputted image data from scanner unit 100 according to direction from the memory controller 41. The selected image data is sent to the memory controller 41 and stored in the image memory 42.

The memory controller 41, which includes a CPU and logic circuits, communicates with the system controller 301, receives commands and carries out the commands. Moreover the memory controller 41 sends status information which indicates the condition of the memory unit 303.

When the memory controller 41 receives an image overlaying command from the system controller 301, the memory controller 41 outputs a command signal of image overlaying to the image overlaying unit 43. Therefore, the inputted image data from the scanner unit 100 and the image data from the memory controller 41 are overlaid at the image overlaying unit 43.

In this image overlaying, the first selector 46 and the second selector 47 are set such as shown FIG. 4. The memory controller 41 reads out image data from the image memory 42 in synchronization with the inputted LSYNC from the scanner unit 100 and outputs to the image overlaying unit 43 in synchronization with the inputted PCLK from the scanner unit 100.

Figure 5:
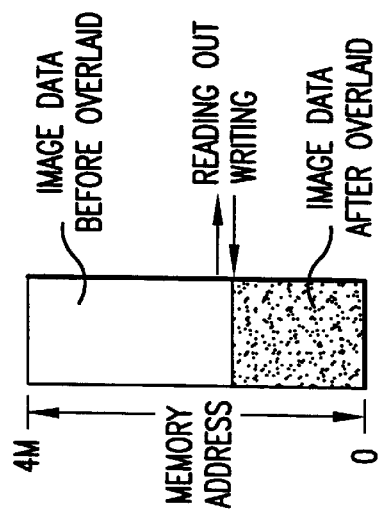
FIG. 5 is a diagram showing the memory map of an image memory of the first embodiment.

The memory controller 41 controls that data storing and data reading out are carried out in parallel. The third selector 48 is set such as shown FIG. 4 and the overlaid image data outputted from the image overlaying unit 43 is sent to the image memory 42 by way of the memory controller 41 and stored. This sending the overlaid image data and the storing into the image memory 42 is carried out in parallel with reading out the data which is previously stored in the image memory 42. As shown in FIG. 5, the memory controller 41 stores the overlaid image data at the address from which the overlaid image data previously read out. Therefore, when the image overlaying is finished, the data in the image memory is rewritten to the overlaid image data.

The storing and reading out are carried out in a timeshared manner. The memory access times for storing and reading out are each a half or less than a half of data transmission time. Therefore, the storing and the reading out are apparently carried out in parallel.

Figure 6:
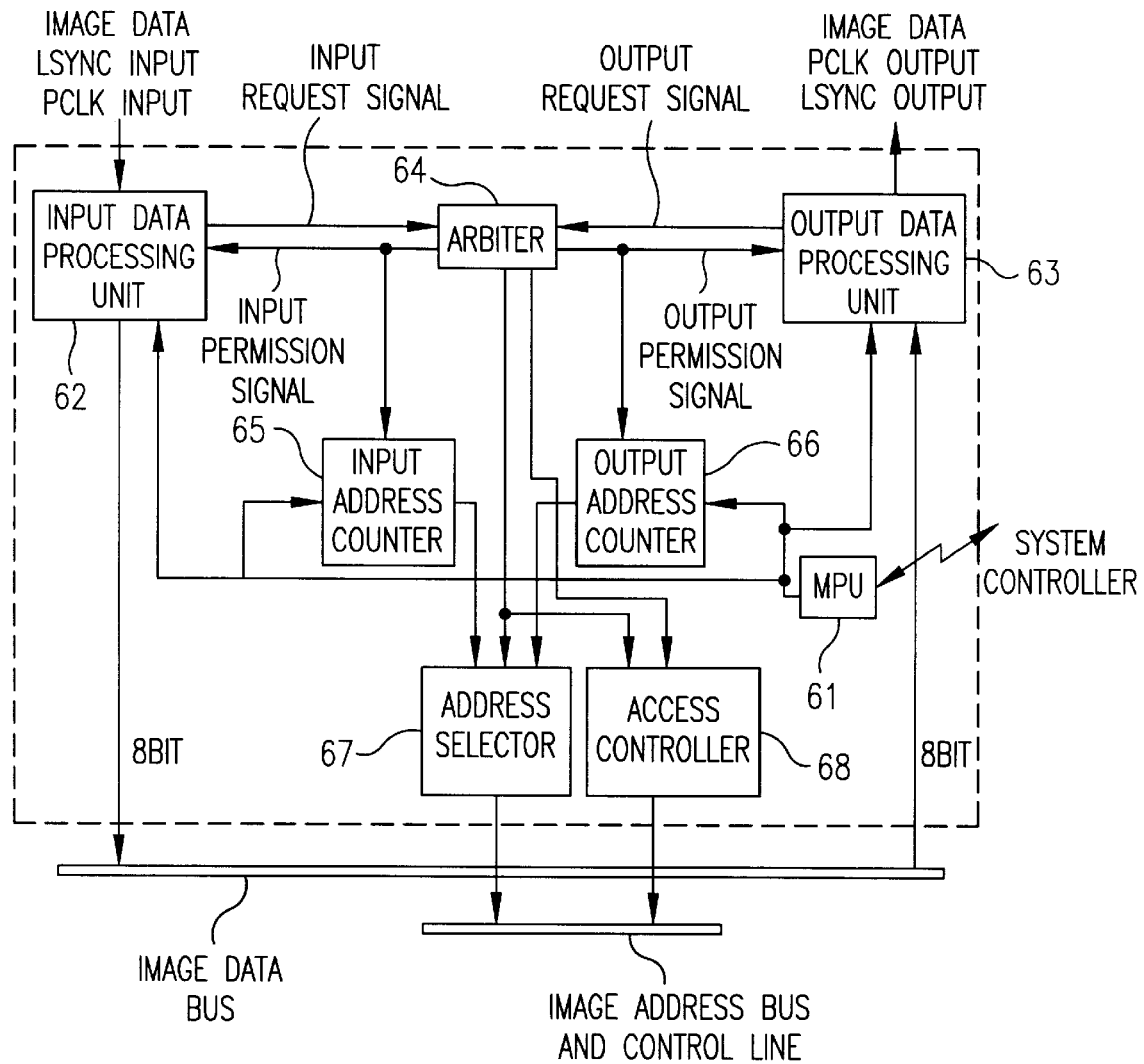
FIG. 6 is a block diagram showing the memory controller of the first embodiment.

FIG. 6 is a diagram of the memory controller 41. In FIG. 6, MPU 61 communicates with the system controller 301. The MPU 61 controls each block according to commands from the system controller 301 and sends a status of the memory unit to the controller 301. An input data processing unit 62 inputs image data, LSYNC input and PCLK input. Input data processing unit 62 converts the serial input image data to parallel 8 bit bus data. An output data processing unit 63 receives the parallel image data and converts the parallel image data to serial data. Then, the output data processing unit 63 outputs the image data by serial, LSYNC output and PCLK output.

An arbiter 64 arbitrates between an input request signal and an output request signal, then outputs an input permission signal or an output permission signal. An input address counter 65 and an output address counter 66 are counters which count according to the input permission signal or the output permission signal output by arbiter 64.

An address selector 67 selects a read address from the input address counter 65 or a write address from the output address counter 66 and outputs the selected address to an image address bus. An access controller 68 outputs a memory control signal to a control line.

Figure 7:
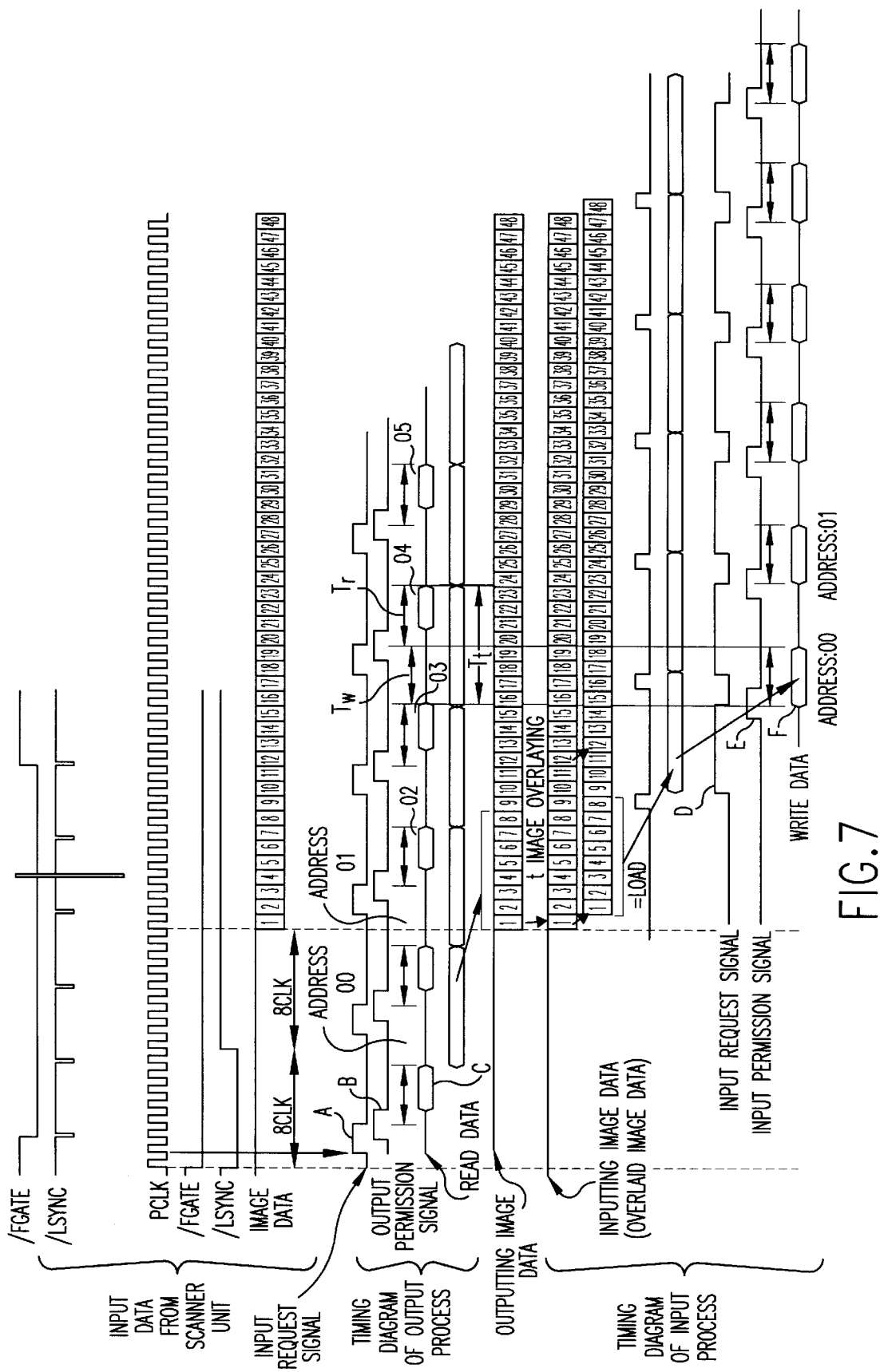
FIG. 7 is a timing diagram of controlling signal and image data at image overlaying.
Figure 8:
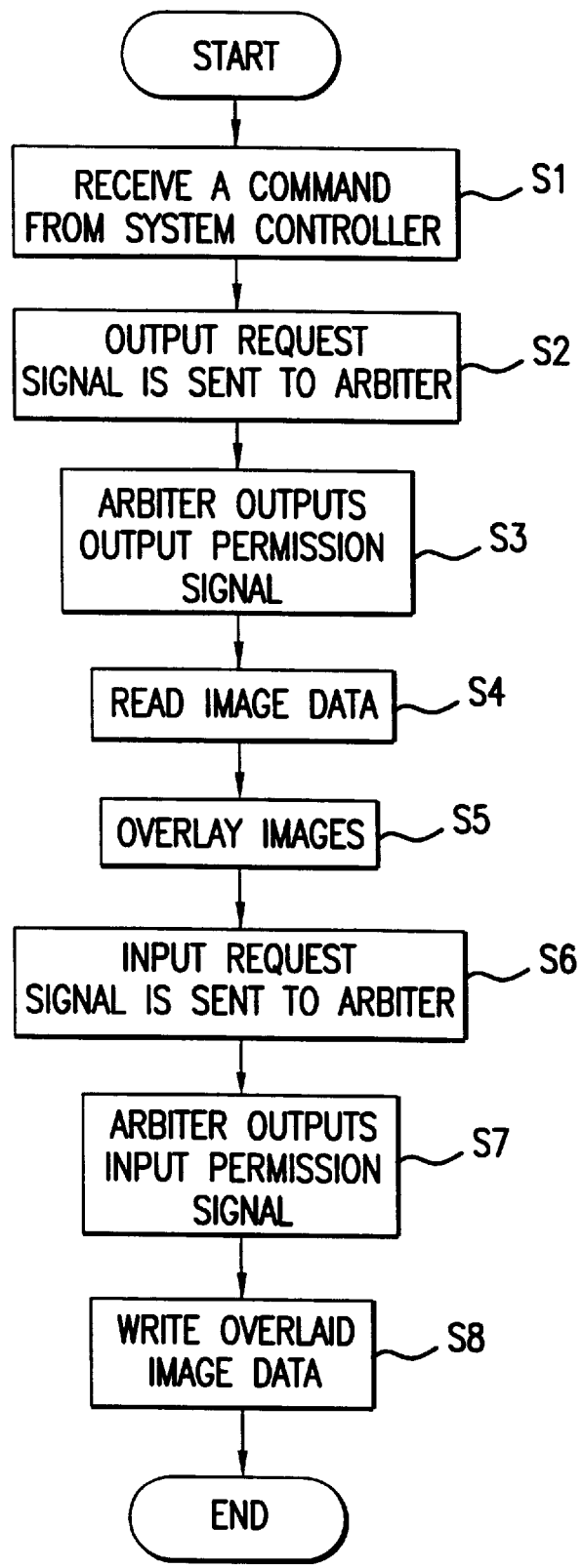
FIG. 8 is a flowchart showing a process of the image overlaying.

FIG. 7 is a timing diagram and FIG. 8 is a flowchart of control performed by the memory controller 41.

At the start, the MPU 61 receives a command about an image overlaying function from the system controller 301 (step S1). At step S2, the output data processing unit 63 outputs an output request signal and the output request signal is sent to the arbiter 64. This output request signal is shown in FIG. 7 by signal A.

At step S3, the arbiter 64 outputs an output permission signal, shown by signal B in FIG. 7, based on the output request signal from the output data processing unit 63.

Then, at step S4, the image data which is stored in the image memory 42 is read out. The reading out is shown by signal C in FIG. 7. At step S5, the read image data is output at predetermined timing and overlaid on the image data which is sent from the scanner unit 100.

Next, at step S6, the input data processing unit 62 outputs an input request signal, shown by signal D in FIG. 7, and the input request signal is sent to the arbiter 64.

At step S7, the arbiter 64 outputs an input permission signal, shown by signal E in FIG. 7, based on the input request signal from the input data processing unit 63.

Then, at step S8, the overlaid image data is written in the image memory 42. This written data is shown by signal F in FIG. 7. In this step S8, the writing is performed when the reading is not performed, with the period Tw shown in FIG. 7. The writing and the reading are carried out in a half or less than a half the time corresponding to a period of data transmission of the memory unit 303. In this embodiment, the period of data transmission is 8 clocks (shown by period Tt in FIG. 7), a reading is carried out in less than four clocks (Tr) and a writing is carried out in four clocks (Tw). Therefore, both the reading and the writing are carried out in the period of data transmission. As a consequence, the reading and writing are effectively carried out in parallel.

The overlaid image data which is stored by the steps just described are outputted to the image forming unit 200 (FIG. 1) and the overlaid image is formed at the forming unit 200 based on LSYNC from the LSYNC generator 45 and PCLK from the PCLK generator 44 which are selected by the first selector 46 or the second selector 47. In this image forming, the scanner unit does not operate because the overlaid image is stored and PCLK and LSYNC which is necessary to access an image memory are generated by the PCLK generator 44 and LSYNC generator 45.

Figure 9:
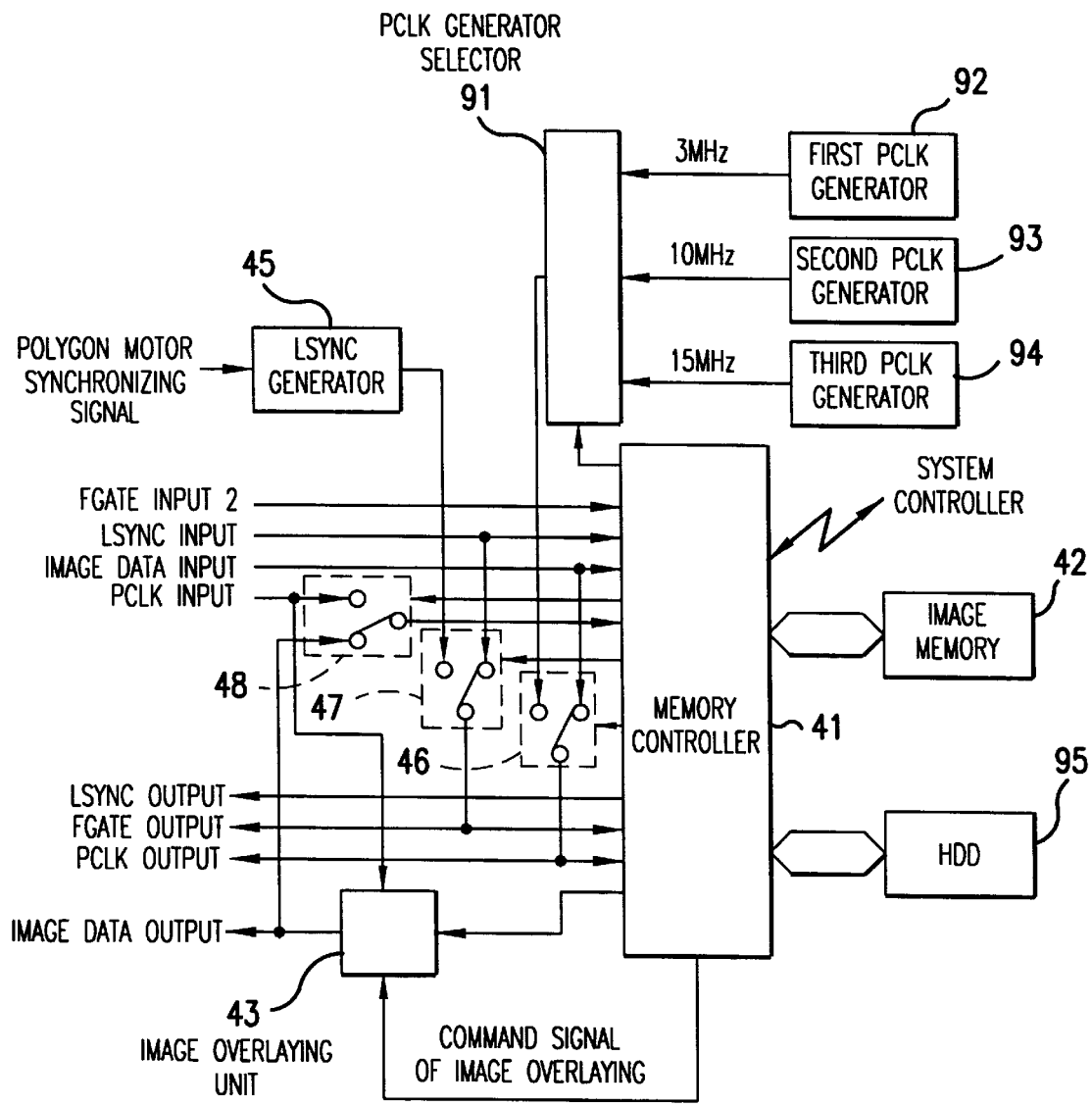
FIG. 9 is a schematic block diagram showing the construction of a system controller of a second embodiment of a digital copier of the present invention.

FIG. 9 is a block diagram of the second embodiment of the present invention, and parts which are same as in the first embodiment in FIG. 4 of the present invention, are indicated by the same reference number. A LSYNC generator 45 generates LSYNC according to the polygon motor synchronizing signal from the image forming unit 200. The frequency of the generated LSYNC is determined according to the characteristics of the image forming unit 400, for example, a print speed and a pixel density.

The first PCLK generator 92, the second PCLK generator 93 and the third PCLK generator 94 generate PCLK of each predetermined frequency, 3 MHZ, 10 MHz and 15 MHz. A PCLK generator selector 91 selects one PCLK generator among three PCLK generators and outputs the PCLK which is generated by the selected PCLK generator to a first selector 46. This selection is carried out according to the information of the frequency of LSYNC from the system controller 301 and this select may be carried out according to the information of the frequency of LSYNC which is detected by the memory controller 41. In this second embodiment, image forming is carried out by the best suited PCLK when the characteristics of the image forming unit 200 are changed as well.

In the second embodiment, a HDD (Hard Disk Drive) 95 is connected to the memory controller 41 (FIG. 9). The image data which is read by the scanner unit 100 are stored in the image memory 42 and in the HDD 95 in tandem. Therefore, even if an image overlaying is carried out at the image memory 42, the image data are not lost because the image is stored in HDD 95.

Figure 10:
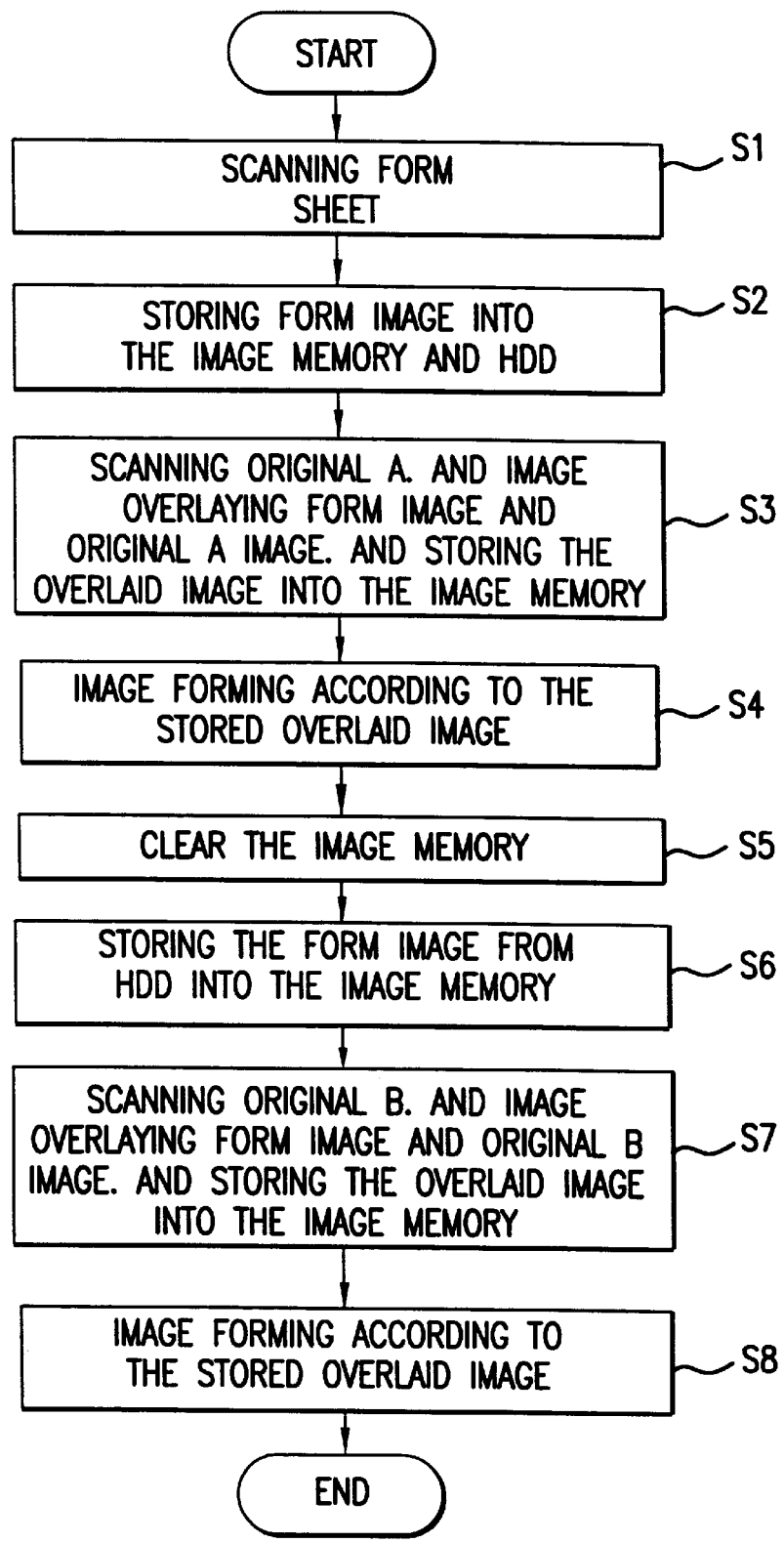
FIG. 10 is a flowchart showing image overlay processing steps according to the second embodiment.

FIG. 10 is the flowchart of the process when two originals, original A and original B, and a form sheet are overlaid using the HDD 95. At step S11, the form sheet is scanned, then, the form image is stored into the image memory 42 and the HDD 95 at step S12. At step S13, the original A is scanned and the image of original A and the form image are overlaid, and the overlaid image is stored into the image memory.

Then, the overlaid image is formed in the image forming unit 200 at step S14. When the image forming is finished, the image memory 42 is cleared at step S15. At step S16, the form image which is stored in HDD 95 is read out and stored into the image memory 42. Then, at step S17, the original B is scanned and the image of original B and the form image are overlaid, and the overlaid image is stored into the image memory. Then, the overlaid image is formed in the image forming unit 200 at step S18.

In above process, the scanning of the form sheet is carried out only one times because at first overlaying of the form sheet, the form image is stored into the HDD 95 and at the second overlaying, the form data is read out from the HDD 95.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuit or by interconnecting an appropriate network of conventional components, as will be readily apparent to those skilled in the art.

This application is based on Japanese patent application 8-48122 filed in the Japanese Patent Office on Feb. 9, 1996 and Japanese patent application 8-334800 filed in the Japanese Patent Office on Nov. 30, 1996, the entire contents of which are hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed is:

1. An image processing apparatus which has an image overlaying function, comprising:

input means for inputting image data;

storing means for storing image data;

image overlaying means for overlaying image data inputted by said inputting means and stored image data read out from said storing means;

control means for controlling reading out image data from said storing means in parallel with storing overlaid image data from said image overlaying means into said storing means, with the overlaid image data being stored in said storing means substantially contemporaneously with reading out stored image data at the address where each respective read out image data was stored;

output means for outputting overlaid image data which is stored in said storing means.

2. An image processing apparatus which has an image overlaying function, comprising:

scanning means for scanning an image and outputting scanned image data with a first synchronizing signal;

storing means for storing image data;

image overlaying means for overlaying image data from said scanning means and stored image data read out from said storing means;

generating means for generating a second synchronizing signal;

selecting means for selecting one of said first synchronizing signal from said scanning means and said second synchronizing signal from said generating means;

control means for controlling reading out image data from said storing means and storing overlaid image data from said image overlaying means into said storing means according to the synchronizing signal which is selected by said selecting means, wherein overlaid image data are stored at respective addresses where read out image data were stored;

output means for outputting overlaid image data which is stored in said storing means.

3. An image processing apparatus according to claim 2, wherein the second synchronizing signal which is generated by said generating means is line synchronizing signal.

4. An image processing apparatus according to claim 2, wherein the second synchronizing signal which is generated by said generating means is a pixel clock signal.

5. An image processing apparatus according to claim 2, wherein said selecting means selects the first synchronizing signal from said scanning means when image overlaying is carried by said image overlaying means and selects the second synchronizing signal from said generating means when the overlaid image is outputted by said outputting means.

6. An image processing apparatus which has an image overlaying function, comprising:

input means for inputting image data;

storing means for storing image data;

image overlaying means for overlaying image data from said inputting means and image data read out from said storing means;

control means for controlling reading out image data from said storing means and storing overlaid image data from said image overlaying means into said storing means, wherein overlaid image data are stored at respective addresses of the storing means in which the read out image data were stored;

generating means for generating synchronizing signal having a frequency selectable from at least two different frequencies;

frequency selecting means for selecting the frequency of said synchronizing signal;

image forming means for forming an image with the overlaid image data stored in said storing means according to the synchronizing signal selected by said frequency selecting means.

7. An image processing apparatus according to claim 6, wherein said frequency selecting means selects the frequency of the synchronizing signal according to a character of said image forming means.

8. An image processing apparatus which has an image overlay function, comprising:

input means for storing image data;

first storing means for storing image data;

second storing means for storing image data;

memory controlling means for controlling transfer of image data stored in second storing means to said first storing means;

image overlaying means for overlaying image data inputted by said inputting means and image data read out from said first storing means;

control means for controlling reading out image data from said first storing means in parallel with storing overlaid image data from said image overlaying means into said first storing means, wherein overlaid image data are stored substantially contemporaneously with reading out stored image data at respective addresses of said first storing means at which read out image data were stored.

9. An image processing apparatus which has an image overlaying function, comprising:

an inputting unit configured to input image data;

an image memory configured to store image data;

an image overlaying circuit configured to overlay image data inputted by said inputting unit and image data read out from said image memory;

a control circuit configured to control reading out image data from said image memory in parallel with storing overlaid image data from said image overlaying circuit into said image memory, wherein overlaid image data are stored substantially contemporaneously with reading out stored image data at respective addresses of said memory at which read out image data were stored;

an outputting unit configured to output overlaid image data in said image memory.

10. An image processing apparatus which has an image overlaying function, comprising:

a scanner configured to scan an image and output scanned image data with a first synchronizing signal;

an image memory configured to store image data;

an image overlaying circuit configured to overlay image data from scanner and image data read out from said image memory;

a generating circuit configured to generate a second synchronizing signal;

a selecting circuit configured to select a synchronizing signal from the first synchronizing signal from said scanner and the second synchronizing signal from said generating circuit;

a control circuit configured to control reading out image data from said image memory and storing of overlaid image data from said image overlaying circuit into said image memory according to the synchronizing signal which is selected by said selecting circuit, wherein overlaid image data are stored at respective addresses of said memory at which read out image data were stored;

an outputting unit for outputting overlaid image data stored in said image memory according to the synchronizing signal selected by said selected circuit.

* * * * *

UNITED STATES PATENT AND TRADEMARK OFFICE
CERTIFICATE OF CORRECTION

PATENT NO. : 5,959,743
DATED : September 28, 1999
INVENTOR(S) : Tomonori TANAKA

It is certified that error appears in the above-identified patent and that said Letters Patent is hereby corrected as shown below:

On the title page, item [30] should be:

--[30] Foreign Application Priority Data
    Feb. 9, 1996 [JP] Japan ............ 8-048122
    Nov. 30, 1996 [JP] Japan ............ 8-334800--

Signed and Sealed this

Eighteenth Day of July, 2000

Attest:

Q. TODD DICKINSON

*Attesting Officer*      *Director of Patents and Trademarks*